US007020685B1

(12) United States Patent
Chen et al.

(10) Patent No.: US 7,020,685 B1
(45) **Date of Patent: *Mar. 28, 2006**

(54) METHOD AND APPARATUS FOR PROVIDING INTERNET CONTENT TO SMS-BASED WIRELESS DEVICES

(75) Inventors: David A. Chen, San Carlos, CA (US); Piyush Patel, San Jose, CA (US)

(73) Assignee: Openwave Systems Inc., Redwood City, CA (US)

(*) Notice: Subject to any disclaimer, the term of this patent is extended or adjusted under 35 U.S.C. 154(b) by 756 days.

This patent is subject to a terminal disclaimer.

(21) Appl. No.: 09/640,902

(22) Filed: Aug. 16, 2000

Related U.S. Application Data

(60) Provisional application No. 60/158,694, filed on Oct. 8, 1999.

(51) Int. Cl.
*G06F 15/16* (2006.01)
*H04Q 7/20* (2006.01)

(52) U.S. Cl. ........................ 709/204; 455/422; 455/466; 455/408; 455/403; 455/406

(58) Field of Classification Search ................. 709/204, 709/219, 232; 455/406, 422
See application file for complete search history.

(56) References Cited

U.S. PATENT DOCUMENTS 5,809,415 A 9/1998 Rossmann
5,911,485 A 6/1999 Rossmann (Continued)

FOREIGN PATENT DOCUMENTS

EP 0777394 A1 6/1997
WO WO 92/14329 8/1992

(Continued)

OTHER PUBLICATIONS

Klaus Schneider, "E–Mail an Handy," p. 56, 1998, XP 000782766.

Steve Smale et al. "HP OpenMail Short Message Service (SMS) Gatewa
y," pp. 1–6, Nov. 4, 1995, XP 000671022.

*Primary Examiner*—Rupal Dharia
*Assistant Examiner*—Djenane Bayard
(74) *Attorney, Agent, or Firm*—Blakely, Sokoloff, Taylor & Zafman, LLP

(57) ABSTRACT

A method and apparatus for providing hypermedia content maintained remotely on a network to a wireless device without a browser are described. A Short Message Service (SMS) request for Internet-based content is received from the wireless device at a proxy server, via an SMS Center (SMSC). The SMS request is transmitted to the SMSC on a wireless network. The proxy server transcodes the SMS request from a character set of the SMSC to a character set of an application and extracts a keyword from the trancoded request. The proxy server maintains a mapping of keywords to URLs. The proxy server looks up the extracted keyword in the keyword-to-URL mapping to identify the URL of an application associated with the keyword. The proxy server constructs an HTTP POST operation containing the keyword and the URL, and submits the HTTP POST operation to the application over a wireline network such as the Internet. Upon receiving an HTTP response containing the requested content from the application in response to the POST operation, the proxy server extracts the content from the HTTP response. The proxy server then translates the content from the content-type used by the application to the content-type used by the SMSC and transcodes the content from the character set used by the application to the character set used by the SMSC. The proxy server then sends the translated and transcoded content in an SMS response to the SMSC, for subsequent delivery to wireless device as an SMS message.

42 Claims, 8 Drawing Sheets

U.S. PATENT DOCUMENTS

| | | | | | |
|---|---|---|---|---|---|
| 6,065,120 | A | | 5/2000 | Laursen et al. | |
| 6,119,167 | A | * | 9/2000 | Boyle et al. | 709/234 |
| 6,247,048 | B1 | * | 6/2001 | Greer et al. | 709/219 |
| 6,353,745 | B1 | * | 3/2002 | Wehrend et al. | 455/466 |
| 6,421,716 | B1 | * | 7/2002 | Eldridge et al. | 709/219 |
| 6,424,841 | B1 | * | 7/2002 | Gustafsson | 455/466 |
| 6,473,609 | B1 | * | 10/2002 | Schwartz et al. | 455/406 |
| 2002/0068554 | A1 | * | 6/2002 | Dusse | |

FOREIGN PATENT DOCUMENTS

| | | |
|---|---|---|
| WO | WO 96/09714 | 3/1996 |
| WO | WO 99/12364 | 3/1999 |

* cited by examiner

METHOD AND APPARATUS FOR PROVIDING INTERNET CONTENT TO SMS-BASED WIRELESS DEVICES

This application claims the benefit of U.S. Provisional Patent application No. 60/158,694, filed on Oct. 8, 1999, and entitled, "Method and Architecture for Bridging SMS-Based Wireless Devices to WAP/Internet Content."

FIELD OF THE INVENTION

The present invention generally relates to using a wireless device to access hypermedia content on a network such as the Internet. More particularly, the present invention relates to a method and apparatus for facilitating access to Internet-based hypermedia content by wireless devices that are not equipped with a browser.

BACKGROUND OF THE INVENTION

For people and businesses requiring instant access to information, the Internet and intranets have provided a vehicle for near real-time delivery of information from an enormous number of sources. For many of those same individuals, a way of communicating regardless of locality has been provided by two-way wireless communication technology such as cellular telephones, two-way pagers, Personal Digital Assistants (PDAs), Personal Information Managers (PIMs), and other handheld computing devices. In recent years, these two rapidly-advancing technology areas have come together, such that the two-way wireless communication device has become one of many entry points into the Internet and intranets.

One feature that many devices used to access the Internet have in common is that they can display hypermedia content, such as web pages. To do so, network servers and network personal computers (PCs) normally use standard web protocols and mark-up languages, such as Hypertext Transport Protocol (HTTP) and Hypertext Markup Language (HTML), respectively. Wireless devices commonly use wireless protocols, such as Wireless Access Protocol (WAP) or Handheld Device Transport protocol (HDTP), and sometimes use markup languages such as Wireless Markup Language (WML) and Handheld Device Markup Language (HDML) to accomplish the same task.

Conventional PCs and some newer-generation wireless devices include browser software (often called "microbrowsers", for wireless devices) for enabling the devices to access hypermedia content on the Internet and other networks. However, many earlier-generation wireless devices are not equipped with microbrowsers. The lack of a microbrowser restricts the ability of such devices to access hypermedia content on the Internet.

Limited Internet access has been provided to such wireless devices using a facility known as Short Message Service (SMS), which is available on many such devices. SMS allows users of certain wireless devices to send and receive alphanumeric messages of limited length (e.g., up to 160 characters). SMS is similar to paging, however, SMS does not require that the wireless device is active and within range when a message is sent; an SMS message generally will be held for a time until the wireless device is active and within range. SMS messages are generally transmitted within the same cell or to anyone with roaming capability. Although SMS messages are of limited length, SMS allows mobile users to receive critical information. SMS messages are typically sent through a narrowband channel that incurs a very low operating cost to the service providers.

SMS based Internet access is primarily performed by a submission of one or more "keyword" messages from the wireless device to a predetermined address or telephone number serviced by a server. After interacting with other information feeds on the Internet, the server prepares an SMS message that includes information based on the "keyword" message. The SMS message is then delivered to the wireless device that requested the information. A typical example is a request of a stock quote, in which the "keyword" message is the stock symbol and the returned SMS message is the corresponding quote information.

One problem with current technology is that service providers offering SMS based Internet access generally use customized and/or proprietary solutions to link the Internet to the wireless networks. These technologies, once in deployment and operation, make it difficult and expensive to conform to an industry-accepted or widely-used standard, such as WAP. WAP is becoming recognized as the next platform standard for the wireless community and has been adopted as the de facto standard by many wireless service providers. WAP-compliant wireless devices are being introduced by wireless telephone handset manufacturers, and WAP-compliant services are being offered by many service providers. There is a need, therefore, for a better solution which allows wireless devices without microbrowsers to access hypermedia content on the Internet.

SUMMARY OF THE INVENTION

The present invention includes a method and apparatus for providing content from a network to a wireless device. According to one aspect of the invention, the content is received from a resource on the network according to a hypermedia protocol. The wireless device is not compliant with the hypermedia protocol. The content is then converted to a message compliant with a message requirement of the wireless device.

Other features of the present invention will be apparent from the accompanying drawings and from the detailed description which follows.

BRIEF DESCRIPTION OF THE DRAWINGS

These and other features, aspects, and advantages of the present invention will become better understood with regard to the following description, appended claims, and the accompanying drawings, in which:

DETAILED DESCRIPTION

A method and apparatus are described for enabling a wireless communication device which does not have a browser to access hypermedia content on the Internet or other networks. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art.

The described technique supports both a "pull" mode of operation and a "push" mode of operation. As described further below, in the "pull" mode, an SMS request for Internet-based content is received at an SMS Center (SMSC) from a wireless device which does not have a browser. The SMSC relays the SMS request to a proxy server that is coupled to a wireline network, such as the Internet. The proxy server transcodes the SMS request into a different character set and extracts a keyword from the trancoded request. The proxy server maintains a mapping of keywords to application identifiers, such as Uniform Resource Locators (URLs) and/or Uniform Resource Identifiers (URIs), which are hereinafter referred to interchangeably as URLs. The proxy server looks up the extracted keyword in the keyword-to-URL mapping to identify the URL of an application residing on a server on the network. The proxy server constructs a hypermedia protocol operation containing the keyword and the URL, and submits the operation over the Internet to the application. Upon receiving a hypermedia protocol response containing the requested content from the application, the proxy server extracts the content from the response and converts the content from the content-type used by the application to a content-type used by the SMSC. The proxy server then transcodes the content from the character set used by the application to a character set used by the SMSC and sends the transcoded content in an SMS response to the SMSC, for subsequent delivery to wireless device as an SMS message.

In the "push" mode, a content application asynchronously (i.e., not in response to any request) sends content to the wireless device, via the proxy server and the SMSC. In that case, the proxy server receives the content from the application in a hypermedia protocol request, translates and transcodes the content as stated above, and provides the content as an SMS message to the SMSC, for transmission to the wireless device.

Figure 1:
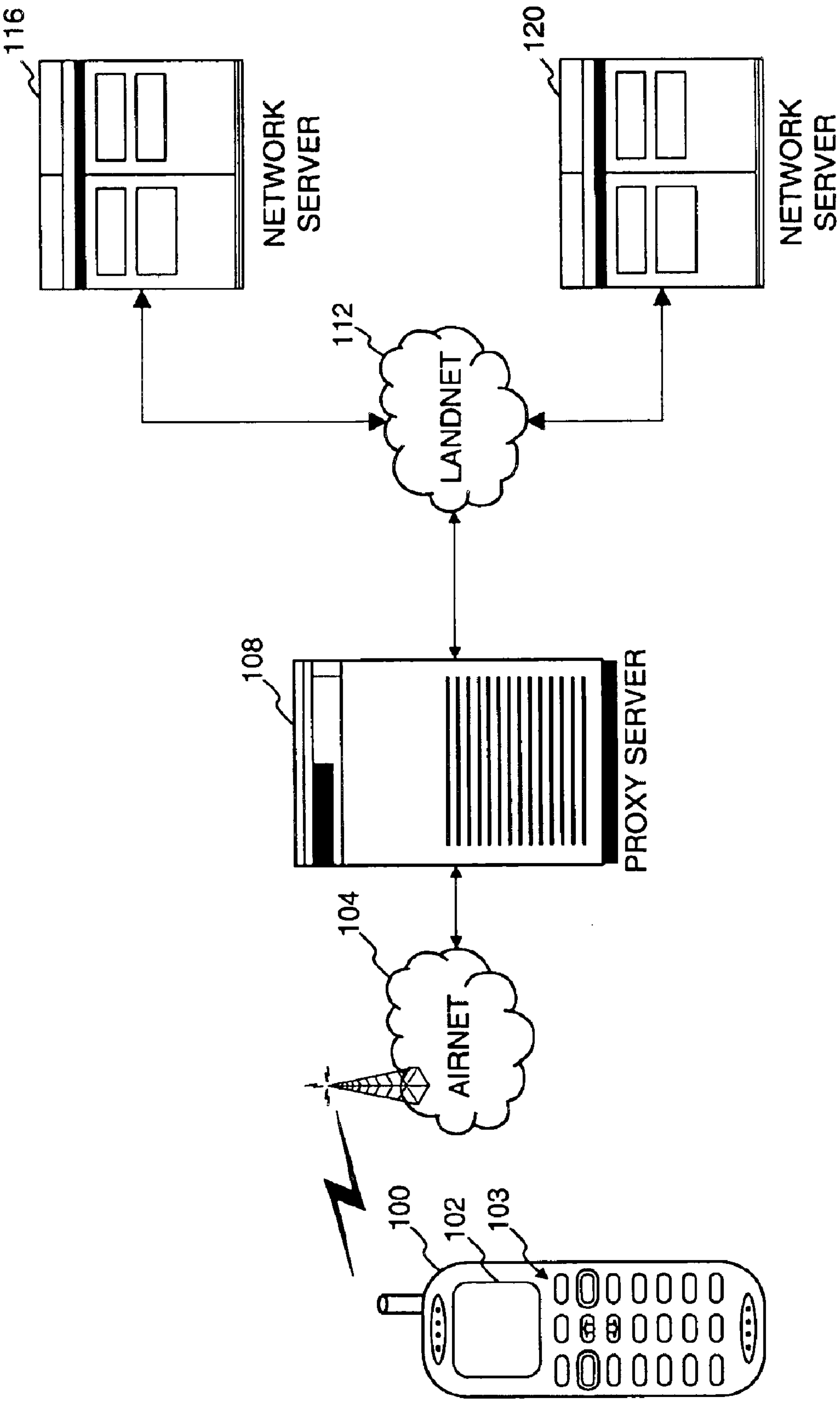
FIG. 1 illustrates a network environment in which a wireless device may be used to access content on the Internet.

FIG. 1 shows a network environment in which a wireless communication device (or simply "wireless device") such as mentioned above can be used. Wireless device 100 may be of any of the types of wireless devices mentioned above, such as a wireless telephone. To facilitate explanation, the example of a wireless telephone is used at various points in the following description. As described herein, wireless device 100 is enabled to receive remotely stored hypermedia information, such as WML documents, HTML documents, Compact HTML (cHTML) documents, Extensible Markup Language (XML) documents, or HDML documents, from one or more network servers, shown as network servers 116 and 120. The retrieved hypermedia information is provided to wireless device 100 in the form of SMS messages. Network Servers 116 and 120 may be, for example, conventional personal computers (PCs) or computer workstations.

Wireless device 100 has a display 102 and a keypad 103. It may be assumed that wireless device 100 does not have a microbrowser capable of accessing and displaying hypermedia content, such as WML cards, HTML pages, or the like. However, it further may be assumed that wireless device 100 does have an SMS editor/reader (hereinafter "SMS editor") to allow the wireless device 100 to send and receive SMS messages.

The communication path between wireless device 100 and network servers 116 and 120 includes a wireless communication network ("airnet") 104, a proxy server 108, and a land-based network ("landnet") 112. Airnet 104 is a network such as a Cellular Digital Packet Data (CDPD) network, a Global System for Mobile (GSM) network, a Code Division Multiple Access (CDMA) network, or a Time Division Multiple Access Network (TDMA) network. The communications protocols used by airnet 104 may include, for example, WAP and/or HDTP. Landnet 112 is a land-based network that may be or include the Internet, an intranet, or a data network of any private network, such as a Local Area Network (LAN). The communication protocol supporting landnet 112 may be, for example, Transmission Control Protocol (TCP/IP), HTTP, or Secure HTTP (sHTTP).

Proxy server 108 acts as a bridge between airnet 104 and landnet 112. Proxy server 108 may be, for example, a conventional computer workstation or PC. Although shown as a physically separate device, proxy server 108 may be implemented in a network server (e.g. network servers 116 or 120) with hardware and software such as well known in the art providing the connection between airnet 104 and landnet 112. Proxy server 108 can be substantially the same as network servers 116 and 120, except that it also includes features of the present invention described herein.

Figure 2:
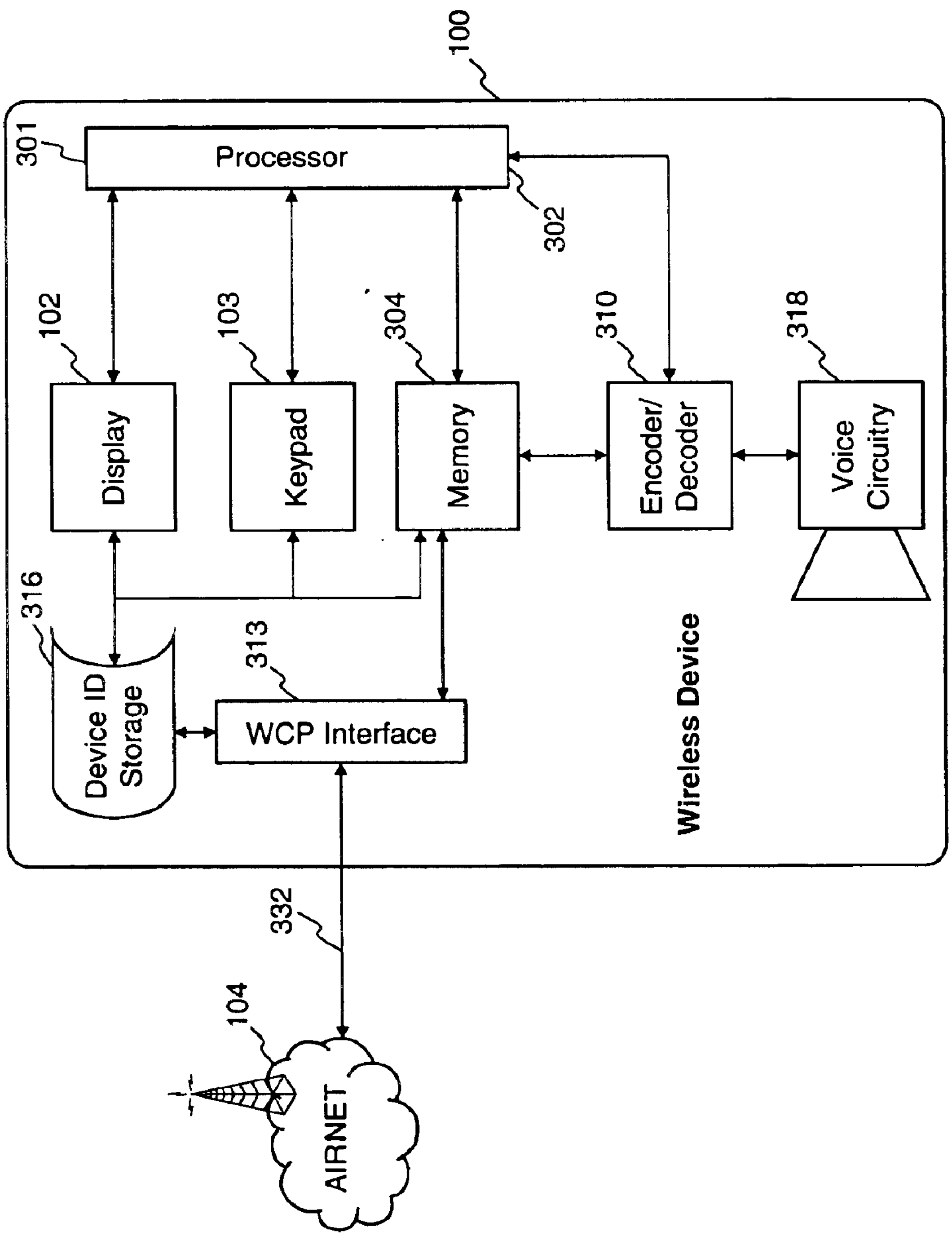
FIG. 2 is a block diagram of the wireless device.

FIG. 2 is a block diagram showing the principle components of wireless device 100, according to one embodiment. The wireless device 100 includes a processor 301, which may be or may include any of: a general- or special-purpose programmable microprocessor, Digital Signal Processor (DSP), Application Specific Integrated Circuit (ASIC), Programmable Logic Array (PLA), Field Programmable Gate Array (FPGA), etc., or a combination thereof. Wireless device 100 includes a Wireless Control Protocol (WCP) interface 328 that couples to a carrier network via airnet 104 to receive incoming and outgoing signals. Device identifier (ID) storage 316 stores and supplies to WCP interface 332 a Mobile Device Identifier (MIN), which identifies wireless device 100 to outside entities (e.g. proxy server 108). The MIN is a specific code that is associated with wireless device 100 and directly corresponds to a device ID in a user account typically provided in an associated proxy server, such as proxy server 108. If the proxy server services a number of wireless devices, there will be a number of such accounts, preferably kept in a database server, each of the accounts corresponding to a different one of the wireless devices.

In addition, wireless device 100 includes memory 304 that stores data and/or software for controlling and/or performing many of the processing tasks performed by wireless device 100. These tasks include: establishing a communication session with a proxy server via wireless link 332 and airnet 104; receiving user inputs from keypad 103, sending and receiving SMS messages, and displaying information on the display 102. Hence, memory 304 may represent one or more physical memory devices, which may include any type of Random Access Memory (RAM), Read-Only Memory (ROM) (which may be programmable), flash memory, non-volatile mass storage device, or a combination of such memory devices. Memory 304 is also coupled to WCP interface 328 for the establishment of a communication session and the requesting and receiving of data.

Assuming, for example, that wireless device is a telephone, wireless device 100 also includes voice circuitry 318 for inputting and outputting audio during a telephonic communication between the user of wireless device 100 and a remote party. Voice circuitry 318 may include, for example, sound transducers, analog-to-digital (A/D) and digital-to-analog (D/A) converters, filters, etc., such as are well-known in the art. An encoder/decoder 310 is coupled between the processor 301 and the voice circuitry 318 for encoding and decoding audio signals.

Figure 3:
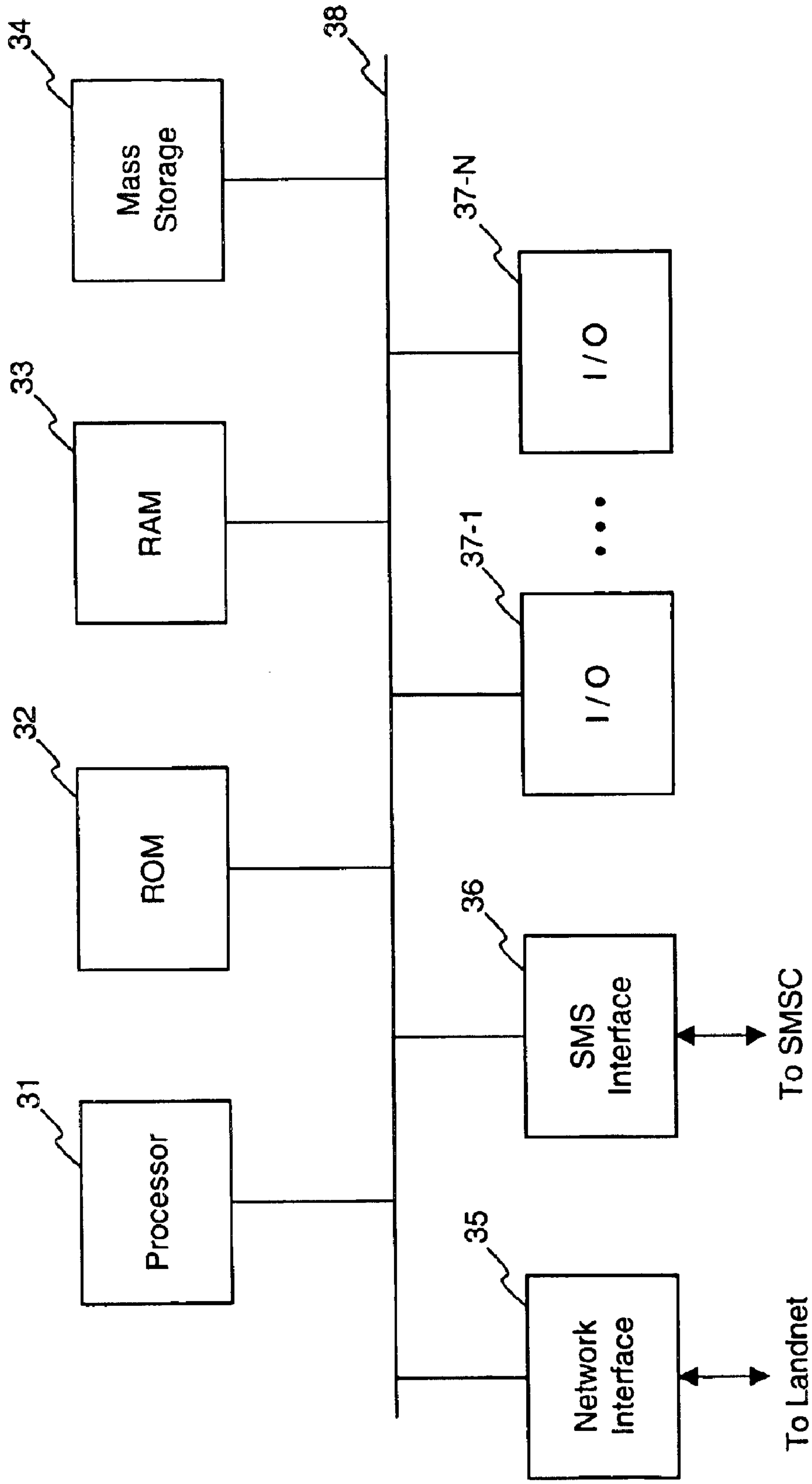
FIG. 3 is a block diagram of a computer system that may represent one or more of the servers in FIG. 1.

FIG. 3 is a high-level block diagram of a computer system representative of any or all of the servers shown in FIG. 1, i.e., proxy server 108 and network servers 116 and 120. As shown, the computer system includes a processor 31, ROM 32, and RAM 33, each connected to a bus system 38. The bus system 38 may include one or more buses connected to each other through various bridges, controllers and/or adapters, such as are well-known in the art. For example, the bus system 38 may include a "system bus" that is connected through an adapter to one or more expansion buses, such as a Peripheral Component Interconnect (PCI) bus. Also coupled to the bus system 38 are a mass storage device 34, a network interface 35, an SMS interface 36, and a number (N) of input/output (I/O) devices 37-1 through 37-N.

I/O devices 37-1 through 37-N may include, for example, a keyboard 15, a pointing device 16, a display device 17 and/or other conventional I/O devices. Mass storage device 17 may include any suitable device for storing large volumes of data, such as a magnetic disk or tape, magneto-optical (MO) storage device, or any of various types of Digital Versatile Disk (DVD) or Compact Disk (CD) based storage.

Network interface 35 provides data communication between the computer system and other computer systems on the landnet 112. Hence, network interface 35 may be any device suitable for or enabling the computer system 1 to communicate data with a remote processing system over a data communication link, such as a conventional telephone modem, an Integrated Services Digital Network (ISDN) adapter, a Digital Subscriber Line (DSL) adapter, a cable modem, a satellite transceiver, an Ethernet adapter, or the like. Similarly, SMS interface 36 provides SMS data communication between the computer system and the SMSC. SMS 36 may be the same or a similar type of device as mentioned above for network interface 35, and in fact, SMS interface 36 be implemented together with network interface 35 in a single communication device.

Of course, many variations upon the architecture shown in FIG. 3 can be made to suit the particular needs of a given system. Thus, certain components may be added to those shown in FIG. 3 for given system, or certain components shown in FIG. 3 may be omitted from the given system.

Note that many of the features described herein may be implemented in software. That is, the described operations may be carried out in a processing system in response to its processor executing sequences of instructions contained in memory. The instructions may be executed from a memory, such as RAM, and may be loaded from a persistent store, such as a mass storage device and/or from one or more other remote computer systems (collectively referred to as "host computer system"). Likewise, hardwired circuitry may be used in place of software, or in combination with software, to implement the features described herein. Thus, the present invention is not limited to any specific combination of hardware circuitry and software, nor to any particular source for the instructions executed by a computer system.

Figure 4:
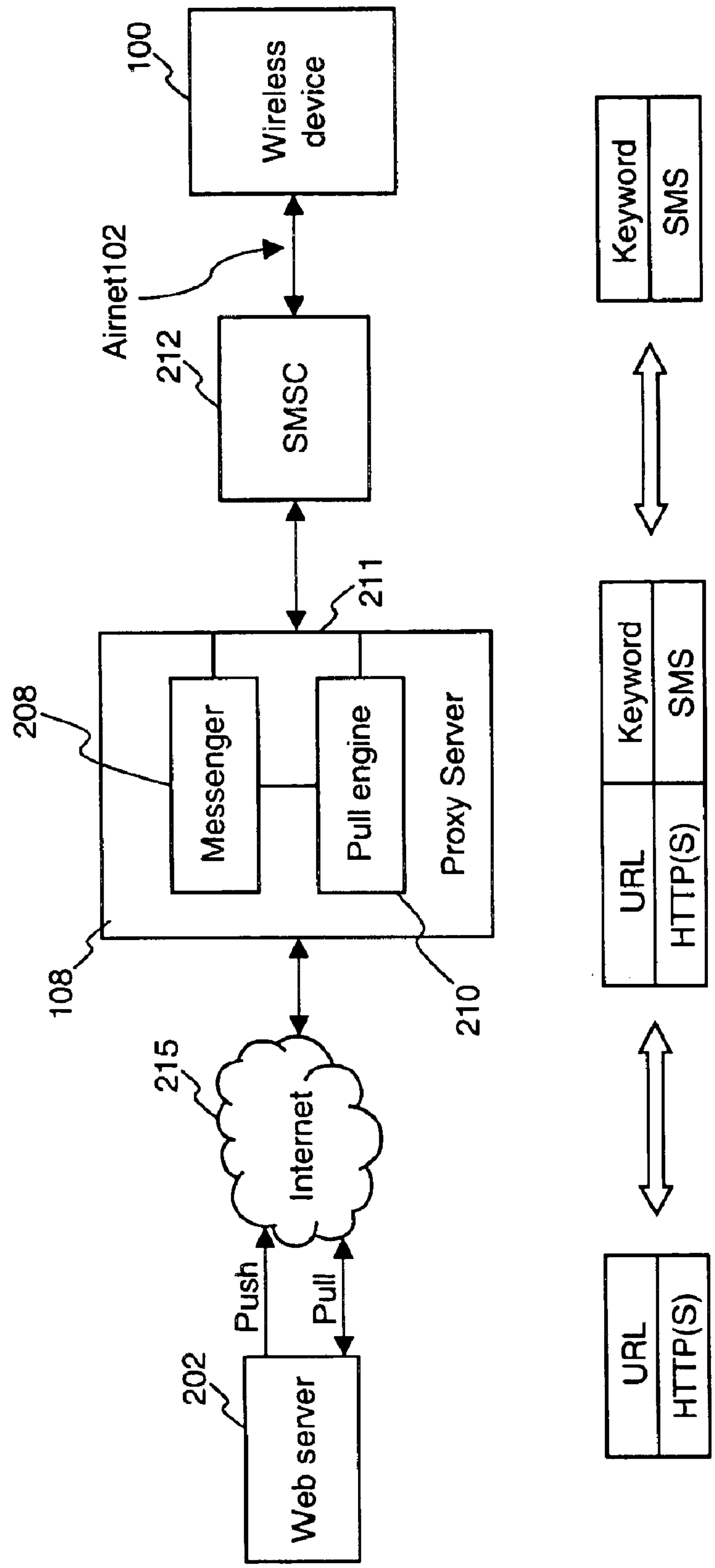
FIG. 4 is a block diagram of a system for using SMS to provide a wireless device with access to hypermedia content on the Internet.

FIG. 4 is a more-detailed block diagram of a system for using SMS to provide the wireless device 100 with access to hypermedia content on the World Wide Web ("the Web"). In FIG. 4, the Internet 215 represents landnet 112 of FIG. 1. Web server 202 represents one of the network servers 104 of FIG. 1 and provides accessible hypermedia information (e.g., HTML pages or WML cards) to other computing devices on the Internet 215. Wireless device 100 accesses the information in web server 202 via SMSC 212 and proxy server 108, which is coupled to Internet 215. Note that the communication between wireless device 100 and proxy server 108 is via the carrier infrastructure, which includes SMSC 212.

When wireless device 100 sends out a "keyword" SMS message received by SMSC 212, the SMS message is forwarded by SMSC 212 to proxy server 108, as dictated by the MIN of wireless device 100. Proxy server 108 sends out a proxy request on behalf of wireless device 100, to web server 202, for hypermedia content corresponding to the "keyword" in the SMS message. The keyword may be, for example, one or more words in the SMS message.

Assume, for example, the user of wireless device 100 desires a real-time quote of the stock price of the company, Phone.com, of Redwood City, Calif. The stock symbol for Phone.com is "PHCM". Accordingly, the user may enter the input "QUOTE PHCM" into the wireless device while in SMS messaging mode, where "QUOTE" is the keyword, such that wireless device 100 is caused to send the input in an SMS message to the designated SMSC 212. Generally, an SMSC does not provide real-time stock quotes and, thus, it must seek out the requested information over the Internet 215 by forwarding the keyword SMS message or extracted information from the SMS message to a proxy server, such as proxy server 108.

Upon receiving the SMS request from the SMSC 212, the proxy server 108 may initially perform certain administrative processes, such as verification that the user is entitled to service. Based on the keyword, the proxy server 108 then identifies an application that can provide the requested information and sends a proxy request to the application. The proxy request includes an address or other identifier identifying a network resource from which the stock quote can be obtained. The address may be a URL or any other identifier suitable for identifying a network resource that may have the requested content. When the stock quote (e.g., the stock price) is received by the proxy server 108 in a mark-up language format (e.g., HTML), the quote information is translated and transcoded by pull engine 210 in proxy server 108 into a format which the SMSC 212 can deliver to the wireless device 100, and then delivered to SMSC 212.

The requested content on web server 202 may be in the form of displayable hypermedia pages constructed in a markup language (e.g., WML or HTML), such that each of the hypermedia pages is identified by a distinct address, such as a URL. When one of the pages is requested, the whole page or a notification including a link of the page can be sent to the wireless device 100, subject to modification by proxy server 108.

It should be noted that other functions of pull engine 208 may include message segmenting if the received content exceeds the maximum SMS message length. More specifically, message segmenting is a process of segmenting a long message into segmented messages, each compliant to the maximum SMS message length (e.g., 150 characters).

The technique described herein has at least two modes of operation, "pull" and "push". The pull mode is used when information is provided to wireless device 100 in response to a request from wireless device 100. Pull engine 210 in proxy server 108 generally carries out the operations of proxy server 108 in the pull mode. The push mode is used to provide information to wireless device 100 even without such a request. Messenger 208 in proxy server 108 generally carries out the operations of proxy server 108 in the push mode. Generally, the push mode is used after an application has determined the user of wireless device 100 is interested in a certain type of content. Although the content that is "pushed" to the wireless device 100 is not sent in response to any particular request from the wireless device 100, the determination of what content to push and to which device it should be pushed may be based on one or more prior keyword requests from the wireless device 100.

Figure 5:
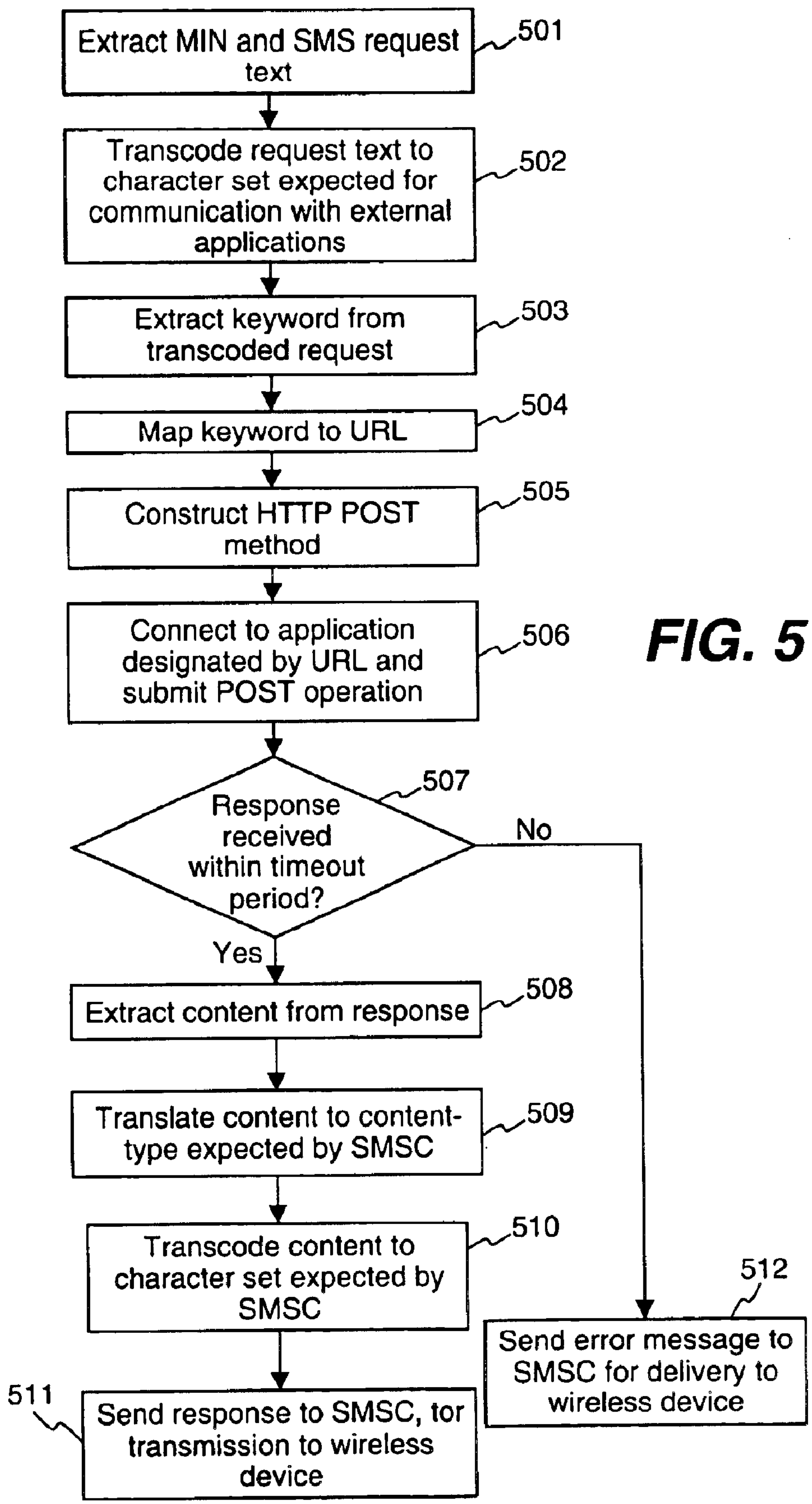
FIG. 5 is a flow diagram showing a process that may be performed by the proxy server to provide a wireless device with access to hypermedia content in the "pull" mode of operation.
Figure 6A:
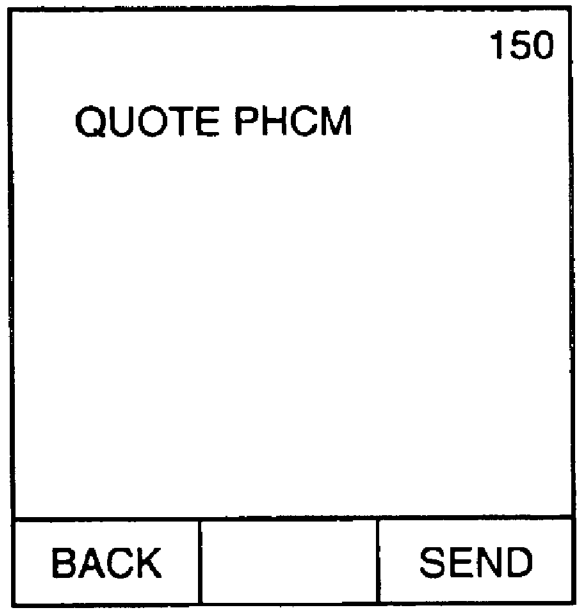
FIGS. 6A and 6B are examples of two displays that may be generated on a wireless device during generation of an SMS request.
Figure 6B:
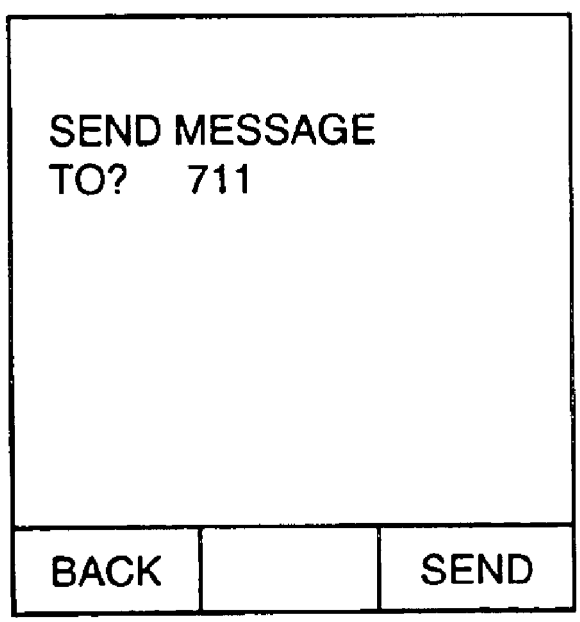

FIG. 5 is a flow diagram showing a process that may be performed by the proxy server 108 in the "pull" mode of operation. Initially, the user of the wireless device 100 activates its SMS editor to input an SMS keyword request. Suppose, for example, the user wishes to find out the current stock price for a company, Phone.com of Redwood City, Calif. Accordingly, using the SMS editor, the user enters "QUOTE PHCM" using the keypad of the wireless device 100. This text is presented on the display of the wireless device 100 as the user types, as shown in FIG. 6A. The user then enters a well-known, predetermined identifier for the proxy server 108, such as "711", which is similarly displayed on the display, as shown on FIG. 6B. Upon entering the identifier, the SMS request "QUOTE PHCM" is sent by the wireless device 10 to the SMSC 212, which routes the request to pull engine 210 in proxy server 108, via interface 211. The communications protocol between the SMSC and the proxy server 108 includes the MN of wireless device 100.

Referring now to FIG. 5, at 501 interface 211 extracts the MIN and the text of the SMS request, and sends the request text to the pull engine 210. At 502 the pull engine 210 transcodes the request text to a character set that is expected when communicating with external applications. Transcoding can be performed using, for example, simple look-up operations, given knowledge of which character sets are being used by the different devices. The pull engine 210 then parses the text of the SMS request. In one embodiment, the "keyword" is taken as the first word of the text of the request. However, a keyword alternatively may be a predetermined number of multiple words, which need not be the initial words of the request. Hence, the pull engine 210 extracts the keyword from the request text from the request text at 503, which in this example is "QUOTE".

The proxy server 108 maintains a mapping (e.g., a look-up table) of keywords and their associated application identifiers (e.g., URLs). This mapping may be made accessible to authorized personnel on a set of conventional Web pages (or any other user interface), to allow the mapping to be modified and updated, using a conventional browser. Thus, proxy server 108 may serve as a conventional Web site for this purpose. Operations that may be supported include adding, deleting, editing, and viewing mapping entries.

Accordingly, at 504, the pull engine 210 uses the mapping to look up the URL corresponding to the keyword of the SMS request. The URL identifies the application which has the requested content (e.g., stock prices). The pull engine 210 then constructs an HTTP version 1.1 ("HTTP/1.1") POST method for the URL, which includes the request ("QUOTE PHCM") and various headers, such as Accept and Accept-Charset. The POST method may also include an extra field that can be used by the application to discover the proxy-specific subscriber number of the wireless device. This field can be used at a later time to "push" content to the wireless device. For example, the MIN of the wireless device can be used for this field.

An example of what the aforementioned POST method may look like is as follows, for the stock quote example (where the URL determined form the mapping should be substituted for "[URL]" in the first line):

```
POST [URL] HTTP/1.1\r\n
x-up-subno: UPWMS-211234567890-_upserver.uplink.com\r\n
Content-Type: text/plain\r\n
Accept: text/plain\r\n
Accept-Charset: ISO_8859-1
\r\n
QUOTE PHCM
```

The pull engine 210 then connects to the application designated by the URL and submits the POST operation at 506, and then waits for the application to reply.

The text/plain content of the POST method is (normally) accepted by the application and processed. In that case, the response from the application is an HTTP/1.1 response with a Content-type of text/plain and a Content-body containing the response. An example of what such a reply may look like is as follows, where the returned content is "PHCM 500¼".

```
HTTP/1.1 200 Document follows\r\n
Content-type: text/plain\r\n
Content-length: 11\r\n
\r\n
PHCM 500 1/4\r\n
```

If no response is received from the application within the timeout period (507), then at 512 the proxy server 108 sends an error message to the SMSC 212, which the SMSC 212 delivers to the wireless device 100. In general, the types of error messages that may be sent by proxy server 108 (when appropriate) include HTTP proxy errors, keyword-to-URL mapping errors, and general link errors.

If a timely response is received, then at 508 the pull engine 210 extracts the content in the response at 508. At 509, the pull engine 210 translates the extracted content from the content-type used by the application (e.g., WML or HTML) to a content-type that can be understood by the SMSC (e.g., text/plain). The translation is described further below. At 510, the pull engine 210 transcodes the content from the character set used by the application (e.g., ISO-8859-1) to the character set expected by the SMS C. (e.g., GSM character set). The transcoding can be accomplished, for example, using simple look-up operations. At 511, pull engine 210 sends the transcoded response content to the SMSC 212 as an SMS message, for transmission to the wireless device 100.

HTTP/1.1 has been described thus far as the protocol used for communication between proxy server 108 and the content application. In other embodiments, however, a hypermedia based protocol other than HTTP may be used instead, or another version of HTTP may be used.

Figure 7:
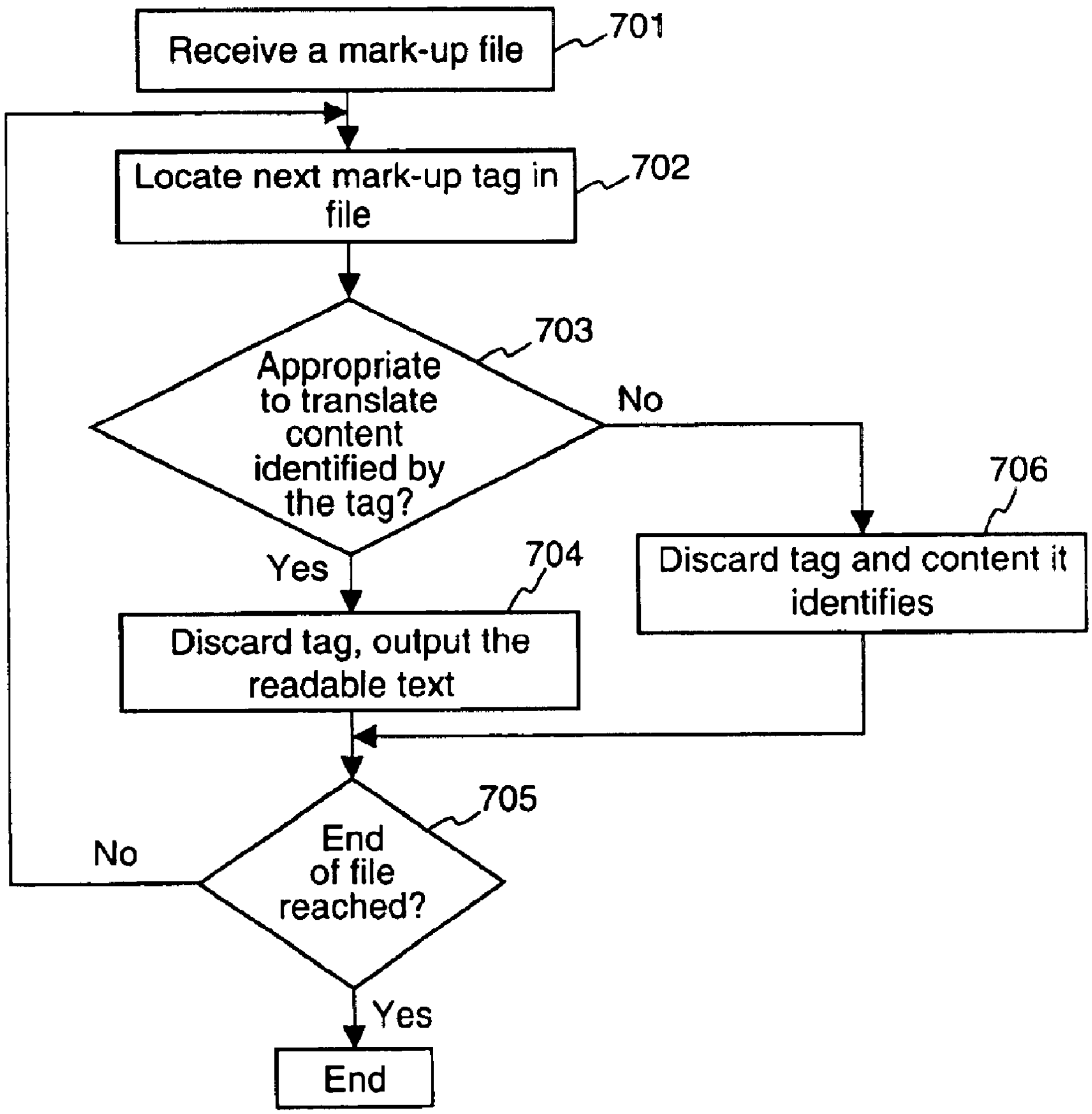
FIG. 7 is a flow diagram showing a process that may be performed by the pull engine to translate content from an application from one content-type to another.

FIG. 7 shows a process that may be performed by the pull engine 210 to translate content received from an application from the content-type used by the application (e.g., WML or HTML) to a content-type that can be used by the SMSC 212 (e.g., text/plain). To facilitate explanation, it is assumed that the application's response is in a mark-up format such as WML or HTML and that the SMSC 212 requires text/plain content. Initially, a mark-up file response from the application is received by the pull engine 210 at 701. At 702, the pull engine 210 locates the next (or first, if applicable) mark-up tag in the file. The pull engine 210 then determines whether it is appropriate to translate the content identified by the tag. If not, the tag and its content are discarded at 706. For example, in WML, it may be considered inappropriate to translate global tags, such as "<wml>" (file marker), "<card>" (card marker), "<a>" (links), etc.

If it is appropriate to translate the identified content, then at 704, the tag is discarded and the readable text of its identified content is output as the translated result for that tag. Following 704 or 706, it is determined at 705 if the end of the file has been reached, based on whether an end-of-file marker tag has been reached. If not, the process repeats from 702 with the selection of the next tag. Otherwise, the process ends.

The process of FIG. 7 can be illustrated using the following example. Assume the following WML file is returned to the proxy server 212 by a stock quote service:

```
<wml>
    <card id="QUOTE" title="quote1">
        <p mode="nowrap">Phone.com, Inc.</p>
        <p mode="nowrap">Last: 78 1/2</p>
        <p mode="nowrap">Chg: +2 3/4(+3.38%)</p>
        <p mode="nowrap">Time: 15:12</p>
        <p mode="nowrap">Vol: 1,141,800</p>
        <p mode="nowrap">Open: 75 1/8</p>
        <p mode="nowrap">High: 80</p>
        <p mode="nowrap">Low: 75</p>
        <a accesskey="1"
href="/wml/refresh.asp?Path=/cgi-bin/quote.dll?Z=1&S=PHCM">
Refresh</a>
        <a accesskey="1"
href="/cgi-bin/quote.dll?Z=2&S=PHCM">Detail</a>
    </card>
</wml>
```

The output of the translation process of FIG. 7 would be:

Phone.com, Inc.

Last 78½

Chg: +2¾ (+3.38%)

Time: 15:12

Vol: 1,141,800

Open: 75⅛

High: 80

Low 75

Once a wireless device 100 initially makes a request for content, the application can remember the MIN of the wireless device 100 and the nature of the request. As a result, the application can determine which type of content the user of wireless device 100 is likely to be interested in, and can subsequently provide such content to the wireless device 100 (via proxy server 108 and SMSC 212) asynchronously, i.e., not in response to any particular request from wireless device 100. This mode of operation is referred to as "push" mode, as noted above.

Figure 8:
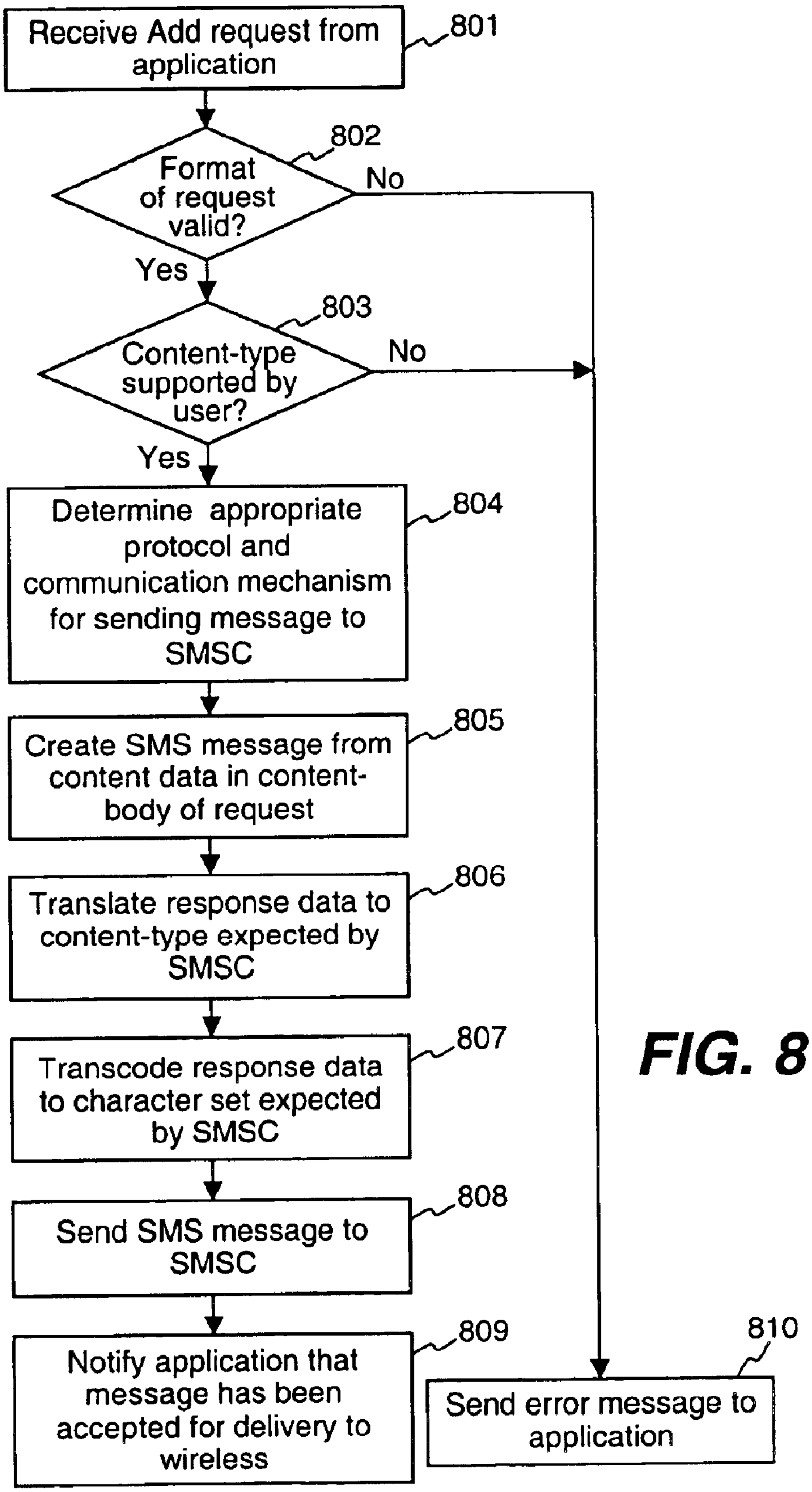
FIG. 8 is a flow diagram showing a process that may be performed by the proxy server to provide a wireless device with access to hypermedia content in the "push" mode of operation.

FIG. 8 is a flow diagram showing a process that may be performed by the proxy server 108 in the "push" mode. As noted above, a field can be added to the original request from the wireless device to allow an application to identify, and subsequently provide relevant content to, a wireless subscriber. At 801, the messenger to await receives an HTTP Add request from a content-providing application. One example of what such a request may look like is as follows, in which a stock quote "PHCM 500¼" is the "pushed" content:

```
POST /ntfn/add HTTP/1.1\r\n
x-up-notifyp-verion: upnotifyp/3.0\r\n
x-up-subno: UPWMS-211234567890-_upserver.uplink.com\r\n
x-up-ntfn-channel: push\r\n
Content-Type: text/plain\r\n
Content-Length: 11\r\n
\r\n
PHCM 500 1/4
```

The content-type of the request is text/plain, and the content-body includes the message to be transmitted to the wireless device 100.

At 802, the messenger 208 determines whether the format of the request is valid. At 803, the messenger 208 determines whether the content-type of the request is supported by the user (i.e., text/plain). If either the format is invalid or the content-type is not supported, then an error message is sent to the application at 810, and the process ends. If the format is valid and the content-type is supported, then at 804, messenger 208 determines the appropriate protocol and communication mechanism to transport the message to the SMSC 212. At 805, messenger 208 creates an SMS message from the data in the content-body of the request received from the application. Messenger 208 then translates the response text from the content-type used by the application (e.g., WML or HTML) to the content-type used by the SMSC (e.g., text/plain) at 806. Next, at 807, messenger 208 transcodes the response text from the character set used by the application (e.g., ISO-8859-1) to that expected by the SMSC 212 (e.g., GSM). Messenger 208 then sends the SMS message to interface 211, which delivers the message to the SMSC 212, at 808. At 809, messenger 208 notifies the application that the message has been accepted for delivery to the wireless device 100.

Thus, a method and apparatus for enabling a wireless communication device which does not have a browser to access hypermedia content on the Internet or other networks have been described. Although the present invention has been described with reference to specific exemplary embodiments, it will be evident that various modifications and changes may be made to these embodiments without departing from the broader spirit and scope of the invention as set forth in the cairns. Accordingly, the specification and drawings are to be regarded in an illustrative sense rather than a restrictive sense.

What is claimed is:

1. A method of providing content from a network to a wireless device, the method comprising:

receiving the content from a resource on the network according to a hypermedia protocol, wherein the wireless device is not compliant with the hypermedia protocol; and converting the content to a message compliant with a message requirement of the wireless device, including generating an SMS message including the content.

2. A method as recited in claim 1, further comprising transmitting the message to an SMS Center (SMSC), for subsequent transmission by the SMSC to the wireless device over a wireless network.

3. A method as recited in claim 2, wherein said converting further comprises translating the content from a first content-type to a second content-type.

4. A method as recited in claim 3, wherein the first content-type is a mark-up language, and the second content-type is plain text.

5. A method as recited in claim 2, wherein said converting further comprises transcoding the content from a first character set to a second character set.

6. A method as recited in claim 2, wherein said converting further comprises:

translating the content from a content-type used by the resource on the network to a content-type used by the SMSC; and transcoding the content from a character set used by the resource on the network to a character set used by the SMSC.

7. A method as recited in claim 3, wherein the first content-type is a mark-up language, and the second content-type is plain text.

8. A method as recited in claim 1, wherein said receiving the content from a resource on the network is responsive to a request for the content from the wireless device.

9. A method as recited in claim 8, wherein the request is an SMS request.

10. A method as recited in claim 9, further comprising, prior to said receiving the content:

converting the request to be compliant with the hypermedia protocol; and and transmitting the request to the resource on the network.

11. A method as recited in claim 1, wherein said receiving the content from a resource on the network is independent of any request from the wireless device.

12. A method comprising:

receiving a request for content from a message service center providing message services to a wireless device;

generating a proxy request, the proxy request including an identifier identifying a network resource capable of providing the content; and converting the content to a message compliant to a message requirement of the wireless device after the content is retrieved from the network resource, the message for subsequent delivery by the message service center to the wireless device.

13. A method as recited in claim 12, wherein the request is an SMS request and the message service center is an SMS Center (SMSC).

14. A method as recited in claim 13, wherein said generating a proxy request comprises performing a hypermedia operation.

15. A method as recited in claim 14, wherein said generating a proxy request comprises:

identifying a keyword associated with the request; and mapping the keyword to an identifier of the network resource.

16. A method as recited in claim 15, further comprising maintaining a mapping of keywords to network resource identifiers.

17. A method as recited in claim 12, wherein said converting comprises:

translating the content from a content-type used by the network resource to a content-type used by the message service center; and transcoding the content from a character set used by the network resource to a character set used by the message service center.

18. A method comprising:

receiving a message based on a request from a wireless device, the message conforming to a first protocol and a first character set implemented by the wireless device;

transcoding the message into a second character set of a network;

identifying a keyword in the message;

mapping the keyword to a network resource on the network;

retrieving, from the network resource, content in the second character set based on the keyword, using a second protocol implemented by the network;

translating the content from a content-type used by the application to a content-type used by the wireless device;

transcoding the content into the first character set; and providing the content to the wireless device in the first character set using the first protocol.

19. A method as recited in claim 18, wherein:

the first protocol is SMS; and the second protocol is a hypermedia based transport protocol.

20. A method as recited in claim 18, wherein:

the content-type used by the application is a mark-up language; and the content-type used by the wireless device is plain text.

21. A method comprising:

receiving a message based on a request from a wireless device;

identifying a keyword in the message;

mapping the keyword to a network resource;

retrieving content from the network resource based on the keyword;

translating the content into a content-type associated with the wireless device; and transcoding the content into a character set compliant with a message requirement of the wireless device.

22. A method as recited in claim 21, further comprising providing the content to a message center using said character set, for subsequent transmission to the wireless device.

23. A method as recited in claim 21, wherein the message comprises an SMS message.

24. A method as recited in claim 21, further comprising providing the content to the wireless device in an SMS response.

25. A method as recited in claim 21, wherein said mapping comprises mapping the keyword to a URL associated with the network resource.

26. A method as recited in claim 21, wherein said retrieving comprises retrieving the content using at least one HTTP transaction.

27. A method as recited in claim 26, wherein the HTTP transaction comprises an HTTP POST operation.

28. A method comprising:

maintaining a mapping of keywords to network resources;

receiving a first SMS message from a wireless device, the first SMS message transmitted on a wireless network;

identifying a keyword in the first SMS message;

using the mapping to determine a network resource associated with the keyword;

retrieving content from the network resource using an HTTP transaction;

translating the content into a different content type;

transcoding the content into a different character set; and providing the content to an SMS Center in a second SMS message, for transmission to the wireless device.

29. A method as recited in claim 28, wherein said using the mapping to determine a network resource associated with the keyword comprises using the mapping to determine a URL associated with the keyword.

30. A method of providing content maintained remotely on a network to a wireless device, the method comprising:

receiving an SMS request for the content from the wireless device via an SMS Center (SMSC), the SMS request transmitted on a wireless network;

transcoding the SMS request from a plain text character set to a mark-up language character set;

extracting a keyword from the trancoded request;

maintaining a keyword-to-URL mapping;

looking up the keyword in the keyword-to-URL mapping to identify a URL associated with the keyword, the URL associated with an application capable of providing said content;

constructing an HTTP POST operation containing the keyword and the URL;

submitting the HTTP POST operation to the application over a wireline network;

receiving an HTTP response from the application in response to the POST operation over the wireline network, the HTTP response containing said content;

extracting the content from the HTTP response;

translating the content from a mark-up language to plain text;

transcoding the content from a character set of the application to a character set of the SMSC; and sending the translated and transcoded content in an SMS response to the wireless device via the SMSC.

31. A method as recited in claim 30, further comprising providing a Web site user interface to allow updating of the keyword-to-URL mapping.

32. A method of providing content maintained remotely on a network to a wireless device, the method comprising:

receiving an HTTP message containing the content from an application, wherein the HTTP message is not in response to a request by the wireless device;

translating the content from a content-type used by the application to a content-type used by the wireless device;

transcoding the content from a character set used by the application to a character set used by the wireless device; and sending an SMS message containing the translated and transcoded content to an SMS center, for delivery to the wireless device.

33. A processing system coupled to a network and configured to provide content from the network to a wireless device, the processing system comprising:

a processor; and a storage facility coupled to the processor and containing instructions executable by the processor which configure the processing system to receive content from a resource on the network according to a hypermedia protocol, wherein the wireless device is not compliant with the hypermedia protocol; and convert the content to a message compliant with a message requirement of the wireless device, including generating an SMS message including the content.

34. A machine-readable program storage medium tangibly embodying a sequence of instructions executable by a machine to perform a method comprising:

receiving a message based on a request from a wireless device;

identifying a keyword in the message;

mapping the keyword to a network resource on the network;

retrieving content from the network resource based on the keyword;

translating the content from a content-type of the application to a content-type usable by the wireless device; and transcoding the content into a character set compliant with a message requirement of the wireless device.

35. A machine-readable program storage medium as recited in claim 34, wherein the method further comprises providing the content to a message center using said character set, for subsequent transmission to the wireless device.

36. A machine-readable program storage medium as recited in claim 34, wherein the message comprises an SMS message.

37. A machine-readable program storage medium as recited in claim 34, wherein said method further comprises providing the content to the wireless device in an SMS response.

38. A machine-readable program storage medium as recited in claim 34, wherein said mapping comprises mapping the keyword to a URL associated with the network resource.

39. A machine-readable program storage medium as recited in claim 34, wherein said retrieving comprises retrieving the content using at least one HTTP transaction.

40. A machine-readable program storage medium as recited in claim 39, wherein the HTTP transaction comprises an HTTP POST operation.

41. An apparatus comprising:

means for receiving a message based on a request from a wireless device, the message conforming to a first protocol and a first character set;

means for transcoding the message into a second character set;

means for identifying a keyword in the message;

means for mapping the keyword to a network resource;

means for retrieving, from the network resource, content in the second character set based on the keyword, using a second protocol;

means for translating the content from a content-type of the application to a content-type usable by the wireless device;

means for transcoding the content into the first character set; and means for providing the content to the wireless device in the first character set using the first protocol.

42. An apparatus for providing content maintained remotely on a network to a wireless device, the apparatus comprising:

means for receiving an SMS request for the content from the wireless device via an SMS center, the SMS request transmitted on a wireless network;

means for transcoding the SMS request from a first character set to a second language character set;

means for extracting a keyword from the trancoded request;

means for maintaining a keyword-to-URL mapping;

means for looking up the keyword in the keyword-to-URL mapping to identify a URL associated with the keyword, the URL associated with an application capable of providing said content;

means for constructing an HTTP POST operation containing the keyword and the URL;

means for submitting the HTTP POST operation to the application over a wireline network;

means for receiving an HTTP response from the application in response to the POST operation over the wireline network, the HTTP response containing said content;

means for extracting the content from the HTTP response;

means for translating the content from a content-type of the application to a content-type usable by the SMSC;

means for transcoding the content from the second character set the first character set; and means for sending the transcoded content in an SMS response to the wireless device via the SMSC.

* * * * *